July 30, 1957    J. H. SCHMID    2,801,008
STRAINER
Filed Feb. 10, 1954
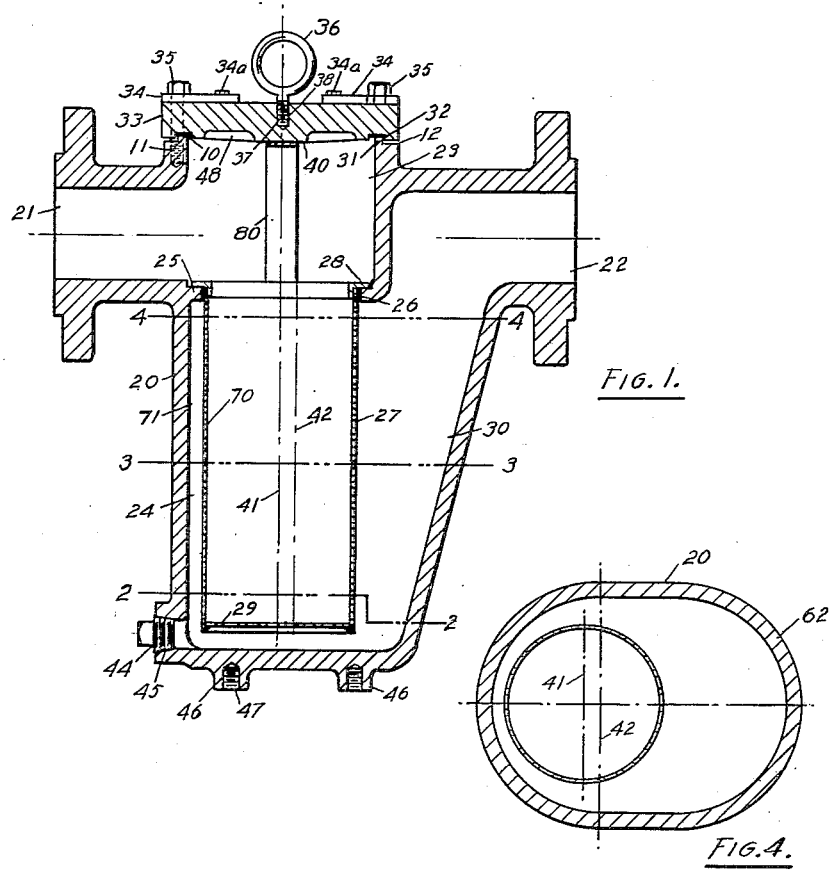
INVENTOR.
John H. Schmid
BY
Charles E. Loveluck

United States Patent Office 2,801,008
Patented July 30, 1957

2,801,008
STRAINER

John H. Schmid, Westfield, N. J., assignor to J. A. Zurn Mfg. Co., Erie, Pa., a corporation of Pennsylvania Application February 10, 1954, Serial No. 409,389

1 Claim. (Cl. 210—444)

This invention relates generally to strainers and more particularly to fittings for disposal in a pipe line with strainers mounted therein whereby the direction of flow of the fluid is changed. This is a continuation in part of my application, Serial No. 169,608, filed June 22, 1950, now abandoned.

All strainers of this character, made in accordance with the teachings of the prior art and with which I am familiar, have a comparatively small area of the strainer member effectively utilized inasmuch as the cylindrical portion of the fitting in which it is encased is an equal distance from the sides thereof and there is not sufficient space between the strainer and the walls of the casing to permit effective fluid flow from all sides of the strainer without substantial changes in velocity of flow of fluid along the path of flow of fluid in the strainer. This results in excessive pressure drops in the strainer and the flow of fluid therethrough.

It is, accordingly, an object of my invention to overcome the above and other defects in strainers adapted to be used in a pipe line and it is more particularly an object of my invention to provide an offset strainer for use in a pipe line which is simple in construction, economical in cost, economical in manufacture, and efficient in operation.

Another object of my invention is to provide an offset strainer for use in a pipe line which provides a maximum sweep for the fluid to get the fluid out of the strainer and minimizes impedance and pressure drop in fluid flowing through the fitting.

Another object of the invention is to provide a cylindrical strainer offset approximately ninety degrees from the inlet of the fitting and offset from the center line of the cylindrical portion of the fitting in which it is encased.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawing:

Fig. 1 is a vertical sectional view of my novel strainer fitting;

Fig. 2 is a cross sectional view taken on line 2—2 of Fig. 1 showing that the strainer is circular in cross section at the bottom thereof;

Fig. 3 is a cross sectional view taken on line 3—3 of Fig. 1 showing that the strainer is generally elliptical at the intermediate point where the cross section is taken; and Fig. 4 is a view taken on line 4—4 of Fig. 1.

Now with more specific reference to the drawing, I show a vertical cylindrical casing 20 having a flanged inlet portion 21 and a flanged outlet portion 22 in axial alignment. The casing 20 has an inlet chamber 23 having a laterally extending passage therethrough defined by wall 25 and cap 33 above aperture 26 and an outlet chamber 24 divided from the inlet chamber 23 by the transverse wall 25. The bottom of the casing 20 is circular. Two sides and one of the ends of the casing 20 are disposed perpendicular to said bottom. The third side of the casing 20 inclines upwardly and outwardly. The casing 20 is oval shaped at any cross section taken therethrough parallel to the bottom, the major axis of each said oval shaped cross section perpendicular to lines 41 and 42 being each progressively greater than the major axis of the oval cross section below it. The transverse wall 25 has an aperture 26 having a center line 41 offset from the center line 42 of the casing 20. The casing 20 has a tapered passageway 30 leading to the outlet 22. A cylindrical cup shaped strainer member 27 with a perforated bottom 29 and perforated sides 70 has an outwardly flanged supporting collar 28 for seating on the wall 25, the strainer member 27 extending downwardly from the aperture 26 in the wall 25. The strainer member 27 has a handle 80 arcuate in shape which is attached to opposite sides of the flanged collar 28.

The casing 20 has an upwardly extending flanged tongue 31 for receiving an annular groove 32 in a cap 33. An annular washer 10 is disposed in the annular groove 32 and is in sealing engagement with the tongue 31. The cap 33 is attached to the casing 20 by C-washers 34 pivoted to the cap 33 by threaded studs 34a. Studs 35 threadably engage the threaded apertures 11 in the upper side 12 of the casing 20. The heads of the studs 35 clear the holes in the cover when the C-washers 35 are swung out of engagement with the studs. An eye bolt 36 has a threaded portion 37 for threadably engaging a threaded aperture 38 in the cap 33 for assembling and removing the cap 33. The cap 33 has an inwardly projecting boss portion 40 engaging the top of the handle 80 to secure the strainer member 27 and the flanged collar 28 thereon in engagement with the apertured wall 25 so that it is kept on its seat. The flanged collar 28 is held tightly against the wall 25 so that no material will pass therebetween. The cap 33 also has radially extending ribs 48 for strengthening same. A cleanout plug 44 is disposed in a laterally extending aperture 45 in the lower end of the casing 20. Projections 46 having threaded apertures 47 extend from the bottom of the casing 20 for mounting it. The casing 20 is oval shaped in cross section as indicated by the various sections at 60, 61, and 62.

It will be noted that the cap 33 has radially extending ribs 48 to make it extremely strong and to make sure that there is no flexing thereof when the studs 35 are drawn on the cap 33. The outer portion of the cap 33 overhanging the tongue 31 tends to be pulled downwardly and the center of the cap 33 tends to be flexed upwardly, thereby placing a heavy strain on the cap 33. The cap 33 is built to withstand this strain. No bolts or studs pass through a gasket, thereby tightly sealing my novel strainer at all times. The washer 10 is nested in the groove 32 so that it is comparatively well protected to give it an efficient and long life.

In the operation of the strainer, fluid passes through the casing 20 from the inlet 21 to the chamber 23 and downwardly through the strainer member 27 and outwardly through the chamber 24, passageway 30, and to the outlet 22. By offsetting the strainer member 27 from the axial center line 42 of the cylindrical surface of the casing 20 reversely to the direction of the flow of fluid, the space between the strainer member 27 and the wall 25 of the chamber 24 adjacent thereto is not restricted but it tapers outwardly as shown in Fig. 1 so that all surfaces of the strainer member 27 may be effectively utilized. Further, the cross sectional area of the casing 20 increases from bottom to top so that a constant velocity of fluid flow from the strainer member 27 is maintained. It will be evident that if the strainer member 27 was concentric with the chamber 24, the space between it and the wall 25 would be the same around over one-half of the periphery thereof. This would impede the flow of fluid from the strainer on the side adjacent the casing thereof. In my novel strainer, fluid is permitted to freely flow at constant velocity from all parts of the strainer, thereby greatly increasing the efficiency thereof and the straining action of the strainer inasmuch as the passageway increases in width as the quantity of flow increases around the strainer member 27 toward the outlet 22. The inside wall of the lower chamber 24 in the casing 20 is spaced from the strainer member 27 a sufficient distance to permit a uniform flow of fluid through all sides of the strainer member 27. The bottom 29 of the strainer member 27 is spaced from the bottom of the casing 20 and the passageway 30 leading to the outlet 22 is tapered to minimize impedance to the flow of fluid passing through the strainer and the casing 20. The strainer member 27 may be removed by merely removing the cap 33 and lifting the strainer member 27 by the handle 80.

As noted in Figs. 2, 3, and 4, the longitudinal axis of the oval shaped cross sectional area of the strainer increases in proportion to the distance the particular cross section is taken from the bottom of the strainer. Further, it is noted in Fig. 1 that one side 70 of the strainer member 27 is spaced at a uniform distance from the side 71 of the casing 20.

In the foregoing specification, I have set forth the invention in its preferred practical forms but I am aware that the structure shown is capable of modification within a range of equivalents without departing from the invention which it is to be understood is broadly novel as is commensurate with the appended claim.

The embodiments of the invention in which an exclusive property or privilege is claimed are defined as follows:

A strainer comprising a casing having an inlet and an outlet spaced opposite each other in the side walls of said casing, said casing being generally round in cross section at the bottom thereof, the portion of the side wall thereof adjacent said inlet extending up from the bottom thereof in the form of a longitudinal half of a right circular cylinder defining a hemi-cylindrical portion, the wall of said casing opposite said hemi-cylindrical portion sloping upwardly from the bottom thereof and away from said hemi-cylindrical portion at a constant rate, said casing being generally oval shaped in horizontal cross section at any horizontal section taken above the bottom thereof and below said inlet and said outlet, a partition in said casing extending from below said inlet in a horizontal direction and then upwardly, said horizontal portion of said partition having an opening therethrough, and a generally cylindrical porous strainer having a porous bottom and having an open upper end in said opening in said partition and extending downwardly therefrom, said strainer being supported by said partition, the central vertical axis of said strainer being disposed generally parallel to the central vertical axis of said hemi-cylindrical portion of said casing, the central vertical axis of said strainer being offset toward said inlet from the central vertical axis of said hemi-cylindrical portion of said casing, said porous bottom of said strainer being spaced above the bottom of said casing a substantial distance, said strainer and said side walls of said casing defining a fluid flow passage being of progressively greater cross sectional area from bottom to top whereby fluid flowing through said fluid flow passage from the sides and bottom of said strainer from said inlet to said outlet has substantially constant velocity.

References Cited in the file of this patent
UNITED STATES PATENTS

| | | |
|---|---|---|
| 755,352 | Brown | Mar. 22, 1904 |
| 794,271 | Anson | July 11, 1905 |
| 1,115,784 | Cranwell et al. | Nov. 3, 1914 |
| 1,152,831 | Monteagle | Sept. 7, 1915 |
| 1,591,262 | Askew | July 6, 1926 |
| 2,083,005 | Czarnecki | June 8, 1937 |